Patented Nov. 13, 1934

1,980,954

UNITED STATES PATENT OFFICE 1,980,954

METHOD OF MAKING CELLULAR CLAY PRODUCTS

Clarence S. Matheny, Haydenville, Ohio, assignor to National Fireproofing Corporation, Pittsburgh, Pa., a corporation of Pennsylvania No Drawing. Application October 7, 1932, Serial No. 636,683

6 Claims. (Cl. 25—156)

This invention relates to a method of making cellular clay products of the character disclosed in copending applications Serial Nos. 453,395 filed May 17, 1930 which has become Patent 1,897,667 and 454,796 filed May 22, 1930, and it is among the objects of the invention to employ a process for controlling the size of the cell structures in accordance with the necessity for producing specific characteristics in the product for particular applications in their use, and the invention further makes provision for weakening the walls of the cells when the cellular structure is designed to be employed for acoustic correction purposes.

As set forth in the above mentioned copending applications, the cellular clay product is formed by compounding clay, dolomite and gypsum, and mixing the powderous ingredients with an acid solution which generates a gas that produces the cellularity in the finished product, the size of the cells being controlled largely by the quantity of gypsum employed to effect quick setting of the liquid mixture. The product is of light weight and is fire-resistant which makes it available for use as a refractory insulator in heating structures, and generally as heat insulation for building purposes.

The present invention has to do with a process for controlling the size of the cells and the density of the cell walls to render the product more efficient in its application for the purposes stated.

The material is a fired clay product of high cellularity. The weight of the material varies with the degree of cellularity and the strength of the light-weight material can be controlled by the size of the cells, the percentage of cellularity, and the degree of burning.

In accordance with the present invention, the cellular clay is produced by feeding powderous clay, gypsum and dolomite in suitable proportions to a blunger containing a solution of sulphuric or hydrochloric acid and blunged until a smooth creamy consistency is obtained. The creamy slip is then poured into molds where the chemical reaction between the various ingredients continues for some minutes which causes the mixture to bloat, forming the cells. By adding a pasty substance, such as flour, to the dry ingredients, the viscosity of the slip is increased, and because of the more plastic proportions of the flour, a film is produced around each dolomite particle so that when the gases are produced through chemical action of the acid solution with the dolomite particles, such gases will be prevented from uniting whereby they are retained as individual cells of relatively small size.

The size of the cells can be varied in accordance with the proportion of flour employed in the mixture, and after the so-called bloating of the product, it will set rapidly on account of the gypsum employed in the mixture, and may be then removed from the blunger and is ready for firing.

Instead of employing the flour to obtain a pasty consistency for producing the film around the dolomite particles, it is obvious that the viscosity of the slip may be increased by the employment of ingredients other than flour, such as finely ground clay.

The essential step in the practice of the invention is the inclusion of an ingredient that will produce a doughy consistency which retards the cell growth, and such doughy substance will, together with the clay body, constitute the cell walls. The doughy consistency retards the cell growth by preventing the gases of two dolomite cells from uniting to form a large cell, and the smaller cell structures obviously have a thicker wall than the large cells so that the resultant product is especially adapted for use as insulating material since the loss of heat by radiation will be greatly retarded by the increased resistance of the larger number of cells in the structure.

When it is desirable to produce a highly porous or weakened cell wall, the flour or its equivalent is omitted and bran is utilized in the clay, dolomite and gypsum mixture with the acid solution. The flaky bran will cinder and burn out of the clay body when the mixed product is subjected to the firing operation, leaving the wall structure of the cells perforated and permitting the cells to communicate with each other. A product of such broken or weakened cells is especially applicable for use for acoustic correction purposes in theatres, radio studios, and the like, since it will only partially weaken the cellular structure which is of sufficient strength to be employed in walls or ceilings for the purposes mentioned.

It has been found that the flour or its equivalent can be used in the following proportions: With one hundred pounds of clay, ground to pass through a twenty-mesh sieve while dry; ten pounds of gypsum and three pounds of dolomite, sixty-mesh; from one ounce to 16 ounces of flour may be employed to control the cell size as desired. These ingredients are mixed with an acid solution of from ¾ to 1% commercial sulphuric acid $H_2SO_4$ and blunged to a smooth creamy consistency and then poured into molds. If flour in excess of the stipulated quantity is employed, it will cause a weakening of the cell walls by the burning of the product which may be desirable in some instances where it is necesssary to produce a structure of small cells with perforated walls, but it is undesirable when the product is to be used for insulating purposes.

It is, of course, obvious to those skilled in the art that the proportion of the ingredients herein specified or the manner of compounding them may be varied within the spirit of this invention.

I claim as my invention:

1. The process of manufacturing a fire-resisting cellular clay product comprising the steps of producing a fluid clay slip by compounding clay, dolomite and gypsum with an acid solution, releasing a gas by chemical interaction of the dolomite and acid in said slip while the latter is in a formative condition, introducing regulated quantities of a pasty substance to confine the chemical interaction to unit particles of the dolomite whereby relatively small cells are formed, and subsequently heat treating the dry cellular mass to harden the product.

2. The process of manufacturing a fire-resisting cellular product comprising the steps of producing a fluid clay slip by compounding clay, dolomite and gypsum with an acid solution, releasing the gas by chemical interaction in said slip by an interaction of the acid with the dolomite present in the mixture, and introducing a pasty substance to confine the interaction of the acid with unit particles of the dolomite whereby the resultant cells are of relatively small size.

3. The process of manufacturing a fire-resisting cellular product comprising the steps of producing a fluid clay slip by compounding clay, dolomite and gypsum, then bloating said mixture by the interaction of an acid solution with the dolomite particles, and introducing regulated quantities of grain flour to produce a film around the dolomite particles to prevent the uniting of the gases generated by said particles into relatively large cells.

4. The process of manufacturing a fire-resisting cellular product comprising the steps of producing a fluid clay slip by compounding clay, dolomite and gypsum, adding a combustible pasty substance to said mixture, bloating said mixture by the interaction of an acid solution with the dolomite present in the mixture, and subsequently heat treating the dry cellular mass to harden the cellular product.

5. The process of manufacturing a fire-resisting cellular product comprising the steps of producing a fluid slip from clay, dolomite and an acid solution, releasing a gas by chemical interaction of dolomite with the acid in said slip while the latter is in a formative condition, regulating the expansion of gases in said slip by introducing regulated quantities of gypsum therein, introducing a pasty substance in said slip to confine the formation of the gases in relatively small cells, and subsequently heat treating the dry cellular mass to harden the cellular product.

6. The process of manufacturing a fire-resisting cellular product comprising the steps of producing a fluid slip from clay, dolomite, and an acid solution, releasing a gas by chemical interaction of dolomite with the acid in said slip while the latter is in a formative condition, regulating the expansion of gases in said slip by introducing a pasty substance to confine the formation of the gases in relatively small cells, and subsequently heat treating the dry cellular mass to harden the cellular product.

CLARENCE S. MATHENY.